United States Patent [19]

Reamey et al.

[11] Patent Number: 5,543,944
[45] Date of Patent: Aug. 6, 1996

[54] METHOD OF IMBIBING A COMPONENT INTO A LIQUID CRYSTAL COMPOSITE

[75] Inventors: Robert H. Reamey, Palo Alto; Kevin Malloy, Belmont, both of Calif.

[73] Assignee: Raychem Corporation, Menlo Park, Calif.

[21] Appl. No.: 333,006

[22] Filed: Oct. 31, 1994

[51] Int. Cl.$^6$ .............. G02F 1/1333; G02F 1/13; C09K 19/52; C09K 19/60
[52] U.S. Cl. ............... 359/51; 359/52; 359/62; 359/98
[58] Field of Search .................. 359/52, 62, 51, 359/98

[56] References Cited

U.S. PATENT DOCUMENTS

| | | | |
|---|---|---|---|
| 5,405,551 | 4/1995 | Reamey et al. | 252/299.01 |
| 5,410,424 | 4/1995 | Konuma et al. | 359/52 |
| 5,430,563 | 7/1995 | Bouteiller et al. | 359/51 |

FOREIGN PATENT DOCUMENTS

| | | |
|---|---|---|
| 0608969A1 | 8/1984 | European Pat. Off. . |
| 0357234A3 | 3/1990 | European Pat. Off. . |
| 0612827A12 | 8/1994 | European Pat. Off. . |
| 2258318 | 2/1993 | United Kingdom . |
| WO95/25777 | 9/1995 | WIPO . |

Primary Examiner—Anita Pellman Gross
Assistant Examiner—Walter J. Malinowski
Attorney, Agent, or Firm—Herbert G. Burkard; Yuan Chao

[57] ABSTRACT

A method is disclosed for making a liquid crystal composite including a component such as a pleochroic dye. The component is imbibed into droplets of a liquid crystal material in a containment medium.

28 Claims, 3 Drawing Sheets

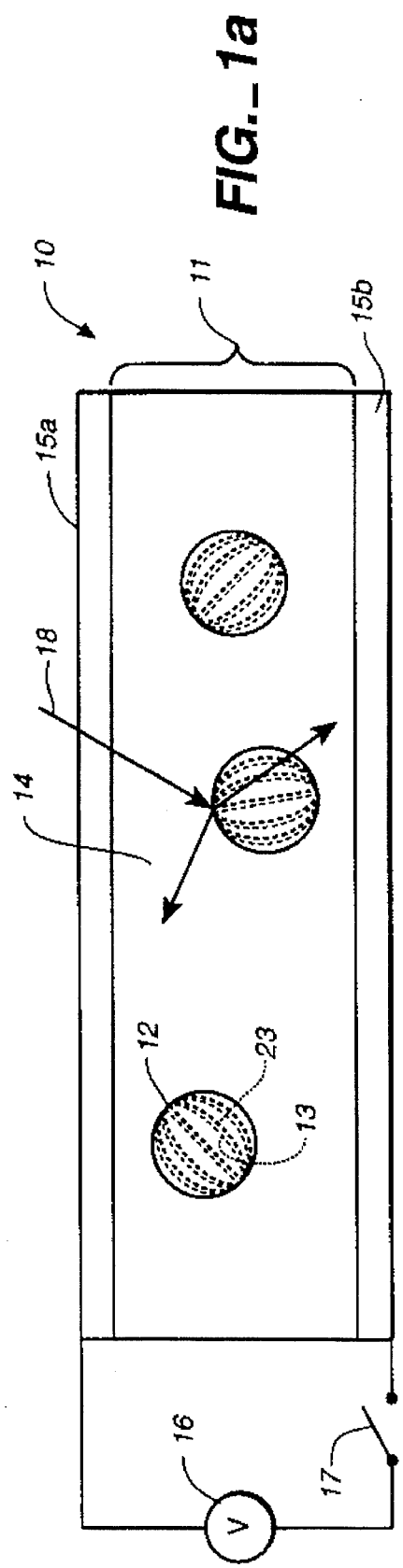
FIG._1a
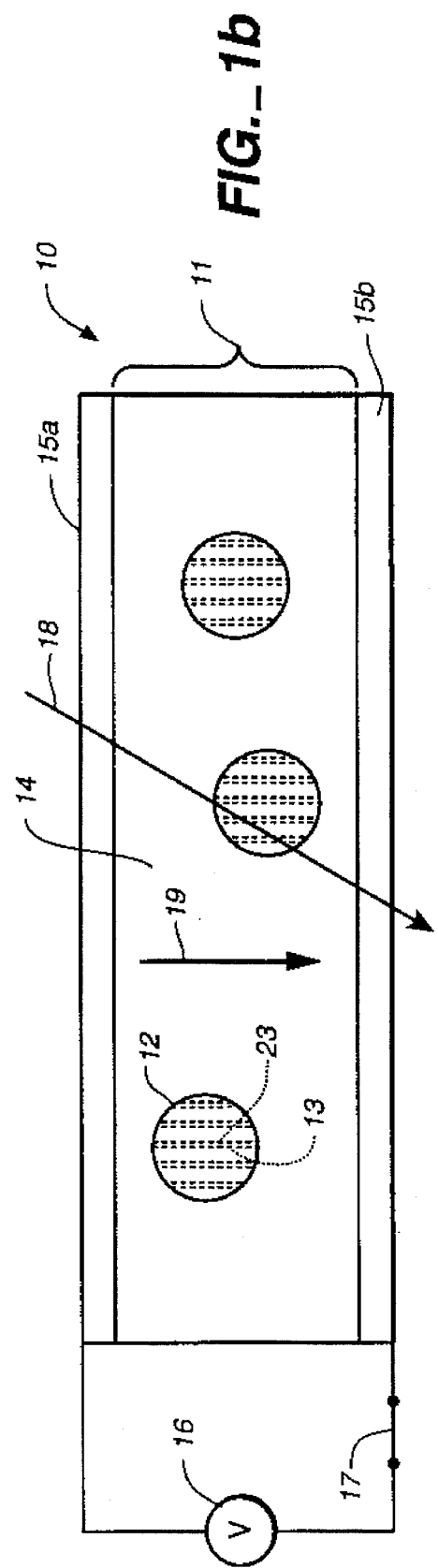
FIG._1b

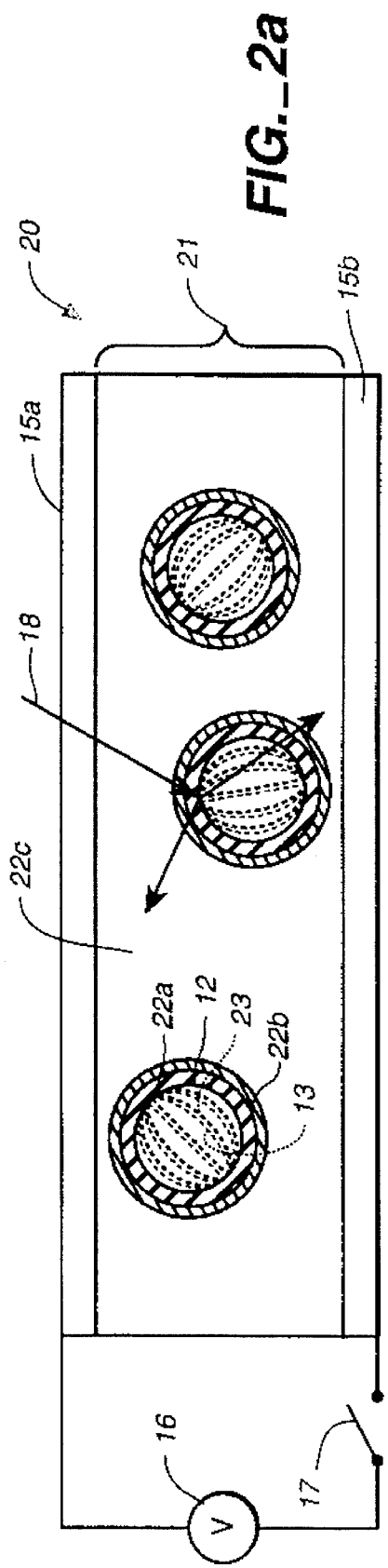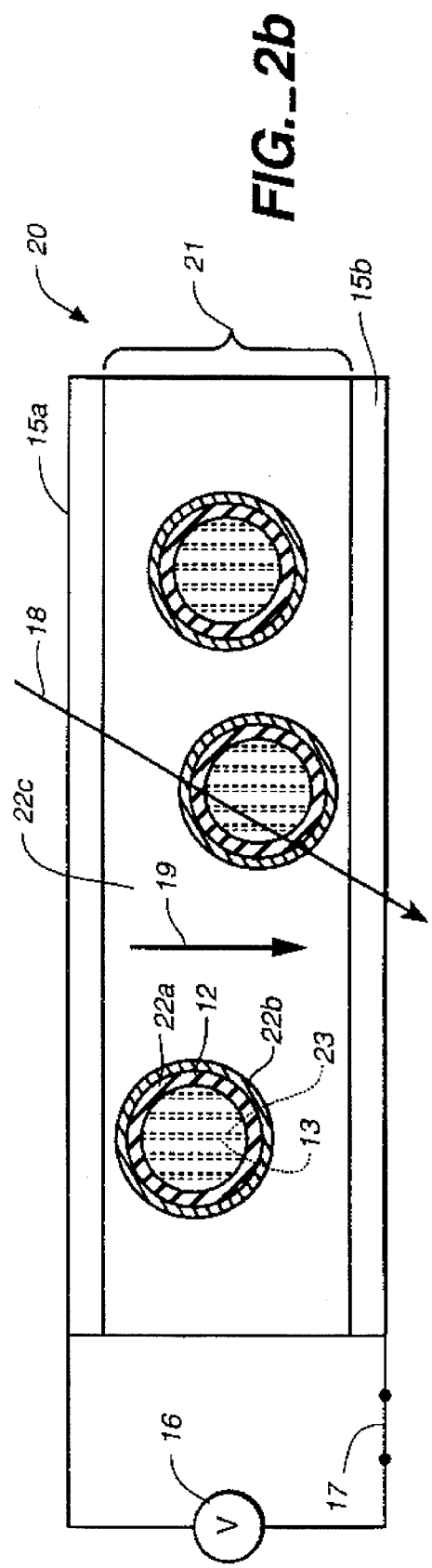

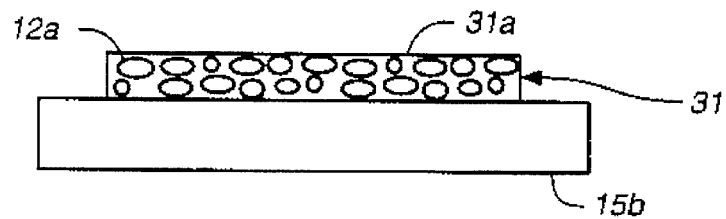
FIG._3a
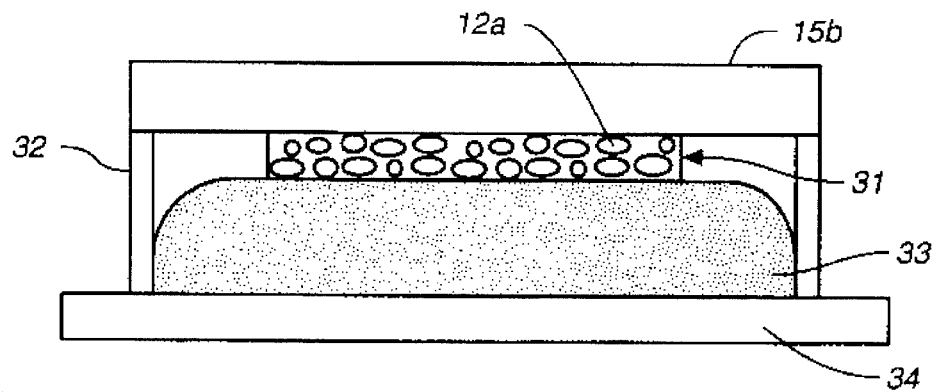
FIG._3b
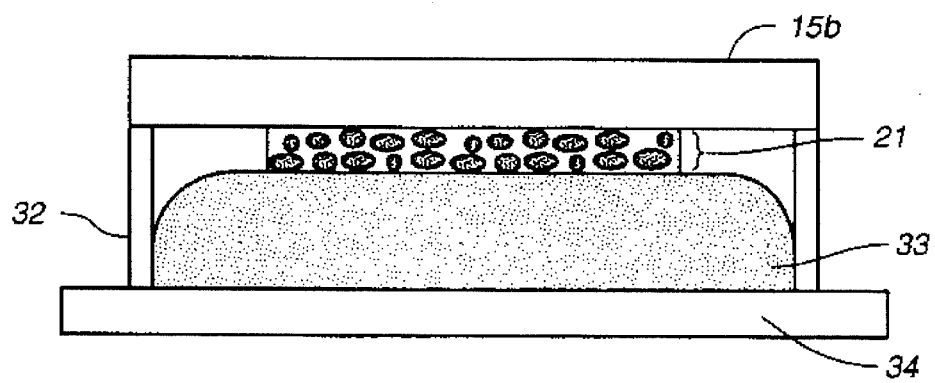
FIG._3c
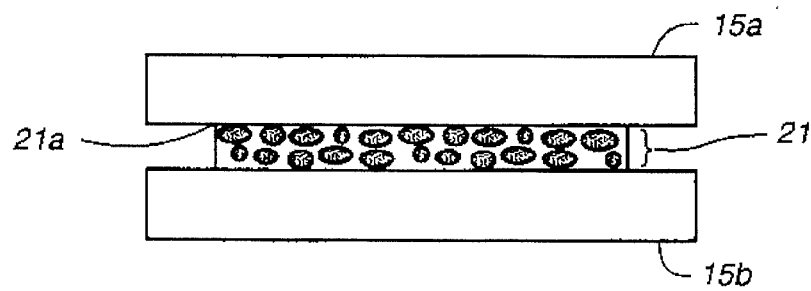
FIG._3d

5,543,944

1

METHOD OF IMBIBING A COMPONENT INTO A LIQUID CRYSTAL COMPOSITE

TECHNICAL FIELD OF THE INVENTION

This invention relates to liquid crystal composites suitable for use in light valves and methods of making such composites including components such as dyes.

BACKGROUND OF THE INVENTION

Liquid crystal light valves in which the electro-optically active element is a liquid crystal composite are known. The composite comprises plural volumes or droplets of a liquid crystal material dispersed, encapsulated, embedded, or otherwise contained within a polymer matrix. Exemplary disclosures include Fergason, U.S. Pat. No. 4,435,047 (1984) ("Fergason '047"); West et al., U.S. Pat. No. 4,685,771 (1987); Pearlman, U.S. Pat. No. 4,992,201 (1991); and Dainippon Ink, EP 0,313,053 (1989). These light valves may be used in displays and window or privacy panels.

The prior art also discloses the concept of having a further material disposed between the polymer matrix and the liquid crystal material. See, for example, Fergason, '047; Fergason et al., U.S. Pat. No. 4,950,052 (1990) ("Fergason 052"); and Raychem, WO 93/18431 (1993) ("Raychem '431"). The purpose of having this further material has been variously stated as preserving the integrity of the volumes of liquid crystal material and for altering the electro-optical properties of the composite.

Improved processes for making composites, including an intervening further material or materials, are disclosed in copending, commonly-assigned applications of Reamey et al., "A Method of Making Liquid Crystal Composite", Ser. No. 08/217,581 (Attorney Docket MP1425-US1), filed Mar. 24, 1994; and Havens et al., "Liquid Crystal Composite and Method of Making", Ser. No. 08/217,268, (Attorney Docket MP1497-US1), filed Mar. 24, 1994; the disclosures of which are hereby incorporated by reference.

It is desirable in certain applications to include a dye or other component in the liquid crystal material of composites including such intervening further materials. However, where the intervening material is set in place by polymerization, the dye or other component may interfere with the polymerization. The present invention provides an effective process for making such composites.

SUMMARY OF THE INVENTION

There is provided a method of making a liquid crystal composite comprising plural volumes of liquid crystal material and a component dispersed in a containment medium. The method comprises the steps of forming volumes of a liquid crystal material in the containment medium, and then imbibing a component into the liquid crystal material in the volumes by placing a solution of the component and a liquid crystal material into contact with the containment medium.

The component preferably is a pleochroic dye, but other components (including non-pleochroic dyes) may also be introduced into the liquid crystal material in this manner. Other components may include interface modifiers, twist agents, and additives for lowering the operating field.

The present invention is also directed to an optical device for producing a display. The device comprises a liquid crystal material in a containment medium and a pleochroic dye imbibed into the liquid crystal material. The device may include electrode means for applying an electric field to different portions of the liquid crystal material in the containment medium.

BRIEF DESCRIPTION OF THE DRAWING(S)

FIGS. 1a–1b show a light valve made from a liquid crystal composite.

FIGS. 2a–2b show a preferred light valve made from a liquid crystal composite made according to the present invention.

FIGS. 3a–3d schematically illustrate stages in a method of imbibing a dye into a liquid crystal composite according to the present invention.

DESCRIPTION OF THE PREFERRED EMBODIMENTS

FIGS. 1a and 1b show a light valve 10 made from a liquid crystal composite, such as described in Fergason '047. Light valve 10 comprises a liquid crystal composite 11 in which droplets or volumes 12 of nematic liquid crystal material 13 having a positive dielectric anisotropy are dispersed in an encapsulating material 14. A pleochroic or dichroic dye 23 may be mixed with liquid crystal material 13 in droplets 12.

Composite 11 is sandwiched between first and second electrodes 15a and 15b, made from a transparent conductor such as indium tin oxide ("ITO"). The application or not of a voltage across electrodes 15a and 15b from power source 16 is controlled by switch 17, shown in FIG. 1a in the open position ("off-state"). As a result, no voltage is impressed across composite 11, and the electric field experienced by liquid crystal material 13 and dye 23 is effectively zero. Due to surface interactions, the liquid crystal molecules preferentially lie with their long axes parallel to the curved interface with encapsulating material 14, resulting in a generally curvilinear alignment within each droplet. The alignment of dye 23 follows the alignment of the liquid crystal molecules. In this particular embodiment, encapsulating material 14 also acts as a matrix to contain the droplets 12 of liquid crystal material 13 and dye 23. The curvilinear axes in different droplets 12 are randomly oriented, as symbolized by the differing orientations of the curvilinear patterns.

Liquid crystal material 13 may have an extraordinary index of refraction $n_e$ which is different from the index of refraction $n_p$ of encapsulating material 14 and an ordinary index of refraction $n_o$ which is substantially the same as $n_p$. (Herein, two indices of refraction are said to be substantially the same, or matched, if they differ by less than 0.05, preferably less than 0.02.) Incident light ray 18 traveling through composite 11 has a high statistical probability of encountering at least one interface between encapsulating material 14 and liquid crystal material 13 in which the liquid crystal index of refraction with which it operatively interacts is $n_e$. Since $n_e$ is different from $n_p$, there is refraction or scattering of light ray 18, both forwardly and backwardly. Additionally, in the off-state, the dye 23 provides a substantial amount light absorption, causing, depending on the dye, composite 11 to produce a colored visual effect. See, e.g., Wiley, U.S. Pat. No. 5,206,747 (1993).

FIG. 1b shows light valve 10 in the on-state, with switch 17 closed. An electric field, which is directionally indicated by arrow 19, is applied between electrodes 15a and 15b, and across composite 11. Liquid crystal material 13, being positively dielectrically anisotropic, aligns parallel to the electric field direction. Dye 23, which follows the orientation of the liquid crystal molecules, also aligns parallel to the electric field direction. (The required voltage is dependent inter alia on the thickness of the composite and typically is between 3 and 100 volts.) Further, this alignment with the field occurs in each droplet 12, so that there is order among the directors from droplet to droplet, as shown symbolically in FIG. 1b. When the liquid crystal and dye molecules are aligned in this manner, the liquid crystal index of refraction with which incident light ray 18 operatively interacts is $n_o$. Because $n_o$ is substantially the same as $n_p$, there is no scattering at the liquid crystal-encapsulating material interface. As a result, ray 18 is transmitted through composite 11, which now appears transparent. Transmission rates of at least 50%, and preferably on the order of 70% or higher may be attained.

In another configuration of composite 11, the birefringence of the liquid crystal material may be relatively low, and the ordinary and extraordinary indices of refraction of the liquid crystal are matched closely, if not identically, to that of the encapsulating material 14. Thus, refraction and scattering at the interfaces between the liquid crystal material and the encapsulating medium are minimized. However, the pleochroic dye in the liquid crystal material provides controlled attenuation of light by absorption as a function of whether an electric field is applied to the droplets 12 and of the magnitude of the field. The dye absorbs light in both the off-state and the on-state. The degree of light absorption, however, is significantly less in the on-state. This configuration is described in Fergason, U.S. Pat. No. 4,556,289 (1985).

The electro-optical performance (e.g., switching voltage, off-state scattering, switching speed, and hysteresis) of light valve 10 is dependent on the nature of the surface interactions between encapsulating material 14 and liquid crystal material 13. An encapsulating material which is desirable in respect of characteristics such as mechanical properties, ability to protect against environmental contaminants, UV stability, etc., may be undesirable in respect of its surface interactions with the liquid crystal material, for example causing the switching speed to be too slow or the switching voltage to be too high. Thus, it is desirable to be able to divorce the surface interactions from the other characteristics of the encapsulating material.

FIGS. 2a–2b (where numerals repeated from FIG. 1a–1b denote like elements) show a light valve 20 of the present invention in which this objective is achieved. Light valve 20 comprises a liquid crystal composite 21. The liquid crystal composite includes liquid crystal material 13 and dye 23 which is first surrounded by an interfacial material 22a and then by an encapsulating material 22b, and finally by a matrix material 22c. The encapsulating material serves an encapsulating function only and the matrix function is served by the matrix material. Light valve 20 may have a colored appearance in the off-state (FIG. 2a) and be transparent in the on-state (FIG. 2b), for the reasons given above.

Liquid crystal material 13 and dye 23 in droplets 12 are separated from encapsulating material 22b by interfacial material 22a. Thus, the surface interactions affecting the alignment of liquid crystal material 13 and dye 23 are predominantly with interfacial material 22a and not with encapsulating material 22b. Interfacial material 22a may be selected on the basis of its interactions with the liquid crystal material and dye. The encapsulating material 22b may be selected on the basis of its mechanical, optical, or other properties. For example, the encapsulating material has to stabilize the emulsion of liquid crystal in a carrier medium where an emulsion process is used. In this way, the necessity to compromise in respect of one set or another of properties may be avoided.

Matching of $n_o$ of the liquid crystal material with the index of refraction $n_p$ of the interfacial material is important only if the thickness of the layer of interfacial material is comparable to the wavelength of light. Generally the thickness is less than approximately 100 nm, much less than the wavelengths of 400 to 700 nm for visible light, so that the matching of the indices of refraction is normally not necessary. However, where the layer of interfacial material is thick or where minimizing on-state haze is an objective (e.g., in window applications), matching of the indices of refraction is desirable.

In order to obtain the advantages of the present invention, it is not necessary that interfacial material 22a completely separates encapsulating material 22b from liquid crystal material 13 and dye 23. It is sufficient that interfacial material 22a at least partially separates the latter two materials, so that the switching characteristics (speed, voltage, hysteresis, etc.) of light valve 20 are characteristic of an interfacial material-liquid crystal material interface and not of an encapsulating material-liquid crystal material interface. Preferably, interfacial material 22a effectively separates encapsulating material 22b and liquid crystal material 13, by which is meant that the interfaces of liquid crystal material 13 are primarily with interfacial material 22a and not with encapsulating material 22b.

In the foregoing figures, the droplets, capsules or volumes 12 of liquid crystal material 13 and dye 23 have been shown as having a spherical shape as a matter of convenience. Other shapes are possible, for example oblate spheroids, irregular shapes, or dumbbell-like shapes in which two or more droplets are connected by channels. Also, the thickness of the layer of interfacial material 22a and the size of droplets 12 have been greatly exaggerated for clarity.

The liquid crystal composites of the present invention provide low voltage, high voltage-holding displays with good optical performance, as discussed further below in connection with the examples provided herein.

In accordance with the present invention, one may emulsify the liquid crystal material, the encapsulating material, and the interfacial material (or a precursor thereof) in a carrier medium to form an intermediate in which the liquid crystal material and interfacial material (or precursor thereof) are contained within the encapsulating material; cool to separate the interfacial material (or precursor) and deposit it between the encapsulating material and the liquid crystal material; where an interfacial material precursor was used, cure the precursor (e.g., photochemically); separate the carrier medium for example by centrifugation, to form capsules or pellets in which the liquid crystal material is successively surrounded by interfacial material and encapsulating material. The use of a centrifuge may, in some instances, be unnecessary. However, extensive centrifuging generally results in lower operating voltages, as the breadth of the droplet size distribution is decreased.

An emulsion may be prepared by rapidly agitating a mixture of liquid crystal material, interfacial material (or precursor thereof), encapsulating material, and a carrier medium, typically water. Optionally, an emulsifier, wetting agent, or other surface active agent may be added. Suitable emulsification techniques are disclosed in Fergason '047, Fergason '052, Raychem '431, and Andrews et al., U.S. Pat. No. 5,202,063 (1993), the disclosures of which are incorporated herein by reference.

The capsules may then be dispersed in a medium in which a matrix material (or precursor thereof) is present. This emulsion can then be coated onto electrode-coated substrate 15b and allowed to dry, cure, solidify, etc., to form a film 31 (see FIG. 3a). The matrix material is thus caused to set around the capsules to form a liquid crystal composite. By "set," it is meant that the matrix material hardens into a continuous resinous phase capable of containing dispersed therein plural volumes of liquid crystal material, with intervening layers of encapsulating and interfacial material. The matrix material may set by evaporation of a solvent or a carrier medium such as water, or by the polymerization of a precursor monomer.

The emulsion is usually dried for over one hour at room temperature so water and other volatiles may be removed. In some cases, the dried emulsion may be stored for weeks before imbibition takes place. Film 31 includes the matrix material and capsules 12a of the liquid crystal material successively surrounded by the interfacial material and the encapsulating material. At this stage, the dye is not present in the liquid crystal material.

Thereafter, in a preferred embodiment, as shown in FIGS. 3b–3d, a liquid crystal material 33 having a dye dissolved therein (or some other component as discussed below) is placed directly into contact with an exposed surface 31a of undyed film 31. This solution may contain between about 0.1 and 10% dye and more preferably between about 0.5 and 5% dye. The liquid crystal material in solution with the dye may be different from the liquid crystal material in the capsules of the undyed film (see Example VI).

The liquid crystal material including the dye is separated from composite film 31 at its periphery by spacers 32. The function of the spacers is simply to maintain contact between the film 31 and the liquid crystal containing dye 33, while preventing direct contact of the film 31 with the substrate 34 on which the liquid crystal/dye mixture resides.

Under selected conditions of time and temperature, the dye diffuses or imbibes into the capsules or droplets 12a of liquid crystal material to form liquid crystal composite 21, which includes dye 23 (see also FIG. 2b). The residual dyed liquid crystal material 33 is then separated from liquid crystal composite 21, and any excess dyed liquid crystal material 33 is removed from surface 21a of liquid crystal composite 21, by exposing that surface to a nitrogen stream. The excess dyed liquid crystal material may also be removed by a deionized (DI) water wash, or by gently rolling or squeeging-off the dyed liquid crystal material on exposed surface 21a of liquid crystal composite 21. Thereafter, an electrode-coated substrate 15a may be laminated onto surface 21a to form a light valve.

The temperature and duration at which imbibing takes place affects the cosmetic and electro-optical performance of a liquid crystal device. If the temperature is too low and contact time too short, little dye transfers into the film. On the other hand, if the temperature is too high or the contact time too long, device performance, such as contrast ratio, is adversely impacted. The time of imbibition may be between about 0.1 and 160 hours, but preferably between about 0.5 and 6 hours. From a processing point of view, short times are more desirable.

The temperature at which imbibition takes place may be set at room temperature, about 20° C., to about 150° C. The preferred temperature is between about 20° and 90° C. If the temperature is too low, imbibition occurs slowly. If the temperature is too high, degradation of liquid crystal and dye can occur.

The use of a nitrogen stream is the most effective method for removing excess liquid crystal and dye. Washing with DI water can produce cosmetic defects on the composite's surface which can be seen in the on-state of a liquid crystal device. Water washing also produces higher operating fields, lower hysteresis, and faster switching speed.

The imbibition method of the present invention may also be used to introduce other components, other than a dye, into the liquid crystal material. Examples of such other components include twist agents, interface modifiers and additives for lowering the operating field. The implementation is analogous to the imbibition of dye as described above. In some cases, the additive, interface modifier, or twist agent, for example, will interfere with emulsion formation, interface agent curing or coating. In these cases, the imbibition process can be used to introduce these materials subsequent to these processes. Additives for lowering the operating field may be those described in Raychem, WO 93/18431 (1993), the disclosure of which is incorporated by reference. Such additives include ethylene oxide copolymers, propylene oxide copolymers, diols such as Surfynol™ 104, phenolic compounds, silane coupling agents, and acrylates or methacrylates. Interface modifiers or agents can be anionic, cationic or non-ionic surfactants and block copolymers. Twist agents are chiral materials which lead to a twisting of the liquid crystal directors within the droplet, such as CB-15 (E. Merck),

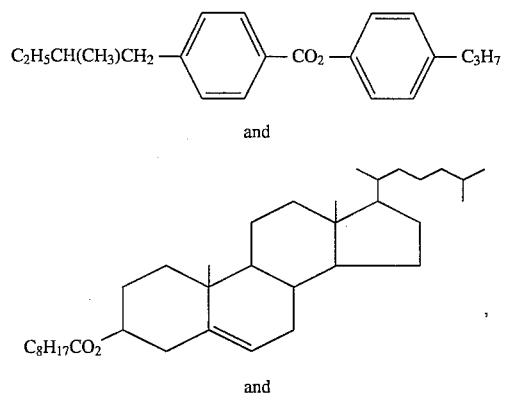

and other cholesterol derivatives. The component should be soluble in the liquid crystal carrier at a level which at which the component is active. The level needed is usually less than 10% by weight.

It should be understood that in the context of the present invention the encapsulating material and the matrix material may not be the same material. Also the method of the present invention may be used to introduce a dye into liquid crystal volumes in a film wherein the encapsulating material acts as a matrix to contain droplets of liquid crystal material and dye, and an interfacial material separates the liquid crystal material and the encapsulating material (see Example III below). Such a film is disclosed in above-mentioned application Ser. No. 08/217,268.

The method of the present invention may also be used to imbibe a dye into volumes of liquid crystal material in a film made by an emulsion process but not including the interfacial material. That is, this method may be used to imbibe a dye into liquid crystal volumes in a film like that disclosed in above-mentioned application Ser. No. 08/217,581, which includes matrix and o encapsulating materials but not an interfacial material.

The present invention may also be used to imbibe a dye into volumes of liquid crystal material surrounded by only an encapsulated material. Such a film is disclosed in Fergason '047 and shown in FIGS. 1a and 1b.

Additionally, a dye may be introduced into liquid crystal volumes in a film wherein one material provides both the interfacial and matrix material functions, and an encapsulating material per se is not used. Such a film may be made by a phase separation process (see Example IV below). A film made by a phase separation process may be thought of as including only a matrix material. A phase separation process is described in West et al., U.S. Pat. No. 4,685,771 (1987), which is hereby incorporated by reference.

The method of the present invention may be used to imbibe a pleochroic dye into a liquid crystal material in a containment medium. The containment medium may comprise an encapsulating material, a matrix material, a combination of encapsulating and matrix materials, a combination of interfacial and encapsulating materials, or a combination of interfacial, encapsulating and matrix materials, all as described above. The containment medium, in whatever form it may take, induces a distorted alignment of the liquid crystal material and dye in the absence of a prescribed input such as an electrical field. An ordered alignment is produced when an electrical field is applied across the liquid crystal material and dye in the containment medium. Light may then be transmitted through the liquid crystal composite.

Suitable encapsulating materials include poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof. A combination of an aqueous carrier medium and an encapsulating material which is soluble or colloidally dispersible in the aqueous carrier medium is particularly preferred. Although surface active agents may be employed, it is generally preferred that the encapsulating material be capable of forming capsules containing the liquid crystal material without their addition. In such cases, the encapsulating material itself should have good surface active properties (i.e., be a good emulsifier). A class of polymers-having such characteristics are amphiphilic polymers containing both hydrophilic and lipophilic segments. Examples of this class include partially hydrolyzed poly(vinyl acetates) (e.g., Airvol™ 205 from Air Products), ethylene-acrylic copolymers (e.g., Adcote™ from Dow Chemical), and styrene-acrylic acid acrylate terpolymers (e.g., Joncryl™ from S. C. Johnson).

As noted above, one may initially form the emulsion not in the presence of the interfacial material, but a precursor thereof, which may eventually be polymerized to form the interfacial material. Phase separation between the liquid crystal material and the interfacial material precursor may be effected by solvent removal or temperature change as described above. Thereafter, the interfacial material precursor is converted to the interfacial material by polymerization. Polymerization of the interfacial material precursor may be initiated by heating (where phase separation is effected by solvent removal) or, preferably, photochemically, for example by irradiation with UV light. Since the interfacial material's solubility characteristics will be different from those of the interfacial material precursor, it may not be necessary, where temperature change methods are used, to do the emulsification at a temperature above the ordinary service temperature of the final composite. As used herein, "polymerizing" and "polymerization" may include the reaction of the interfacial material (or its precursor) with the encapsulating material to fix the interfacial material between the liquid crystal material and the encapsulating material.

Suitable interfacial material precursors include mono- or difunctional acrylates, mono- or difunctional methacrylates, epoxies (for example, those cured with thiols, amines or alcohols), isocyanates (for example, those cured with alcohols or amines), and silanes. Precursors with branched alkyl units, for example 2-ethylhexyl acrylate, are preferred.

Suitable interfacial materials are the corresponding polymers and oligomers derived from the above-listed precursors, namely acrylates, methacrylates, epoxies, polyurethanes, polyureas, siloxanes, vinyl polymers, and mixtures thereof.

Suitable matrix materials include polyurethane, poly(vinyl alcohol), epoxies, poly(vinyl pyrrolidone), poly(ethylene glycol), poly(acrylic acid) and its copolymers, poly(hydroxy acrylate), cellulose derivatives, silicones, acrylates, polyesters, styrene-acrylic acid-acrylate terpolymers, and mixtures thereof. Various combinations of these materials can be used to form the matrix. For instance, in a preferred embodiment, the matrix may comprise a 50:50 blend of poly(vinyl alcohol) and polyurethane.

Various dichroic or pleochroic dyes may be used in the method of the present invention. Exemplary dye materials are black dichroic mixtures such as MGG1 dye mixture, as described below. Azo, anthraquinone, and perylene dyes may be used.

A preferred combination of interfacial material, encapsulating material, and matrix material is poly(2-ethylhexyl acrylate), poly(vinyl alcohol), and a 50:50 blend of poly(vinyl alcohol) and polyurethane, respectively. A black pleochroic dye blend is preferred. Most applications want an "on-off" shutter requiring a black off-state. A black dye blend may be obtained by mixing at least three dyes, as described in the examples. Such composites were found to have especially low operating fields, low field-off transmission, wide operational temperature ranges, and good voltage-holding performances.

It can be advantageous to crosslink, physically entangle molecular chains, or otherwise ensure that the encapsulating material is fixed in place, so that displacement by the matrix material is minimized.

The above discussions have been in the context of nematic liquid crystals having a positive dielectric anisotropy, but other types of liquid crystals may be encapsulated by the method of this invention. One may apply the techniques of this invention to liquid crystal composites in which the liquid crystal material is a chiral nematic (also known as cholesteric) one, such as disclosed in Crooker et al., U.S. Pat. No. 5,200,845 (1993), and copending, commonly-assigned application of Jones, "Chiral Nematic Liquid Crystal Composition and Devices Comprising the Same," Ser. No. 08/139,382, filed Oct. 18, 1993 (Attorney Docket No. MP1495-US1). Also, composites in which the liquid crystal material is a smectic, as disclosed in Pearlman et al., U.S. Pat. No. 5,216,530 (1993), are contemplated.

The practice of this invention may be further understood by reference to the examples below, which are provided by way of illustration and not of limitation. All relative amounts are by weight unless indicated otherwise.

The electro-optical performance of liquid crystal devices of the present invention are provided in the tables associated with the examples. The following general procedures were used in making these measurements.

Optical measurements were obtained with f/0 collection optics and a collimated 550±40 nm light source. For each test, $T_{on}$ is the maximum transmission in the presence of a voltage, $T_{off}$ is the percent transmission in the absence of an applied voltage, and $E_{90}$ is the field (in volt per micron (V/μm)) required to turn a device on to 90% of the difference between $T_{on}$ and $T_{off}$. In order to measure $T_{on}$ and $E_{90}$, samples were stepped up and down in voltage (25 steps up/25 steps down, 0.7 sec/step) to a relatively high field (typically 8–10 V/μm). The value $T_{90}$ is given by the equation: $T_{90}=0.9(T_n-T_{off})+T_{off}$. The applied field needed to reach $T_{90}$ on the up curve is $E_{90}$ (the up curve being the % T/V curve obtained with increasing voltage). $E_{90}$ is substantially independent of sample thickness. The corresponding operating voltage $V_{90}$ is thickness-dependent and has units of volts. $V_{90}$ is obtained by multiplying $E_{90}$ by the thickness (t) in microns of the liquid crystal structure ($V_{90}=t \cdot E_{90}$).

The switching speed of a device is a measure of the time for a film of encapsulated liquid crystal material to turn on or off with the application or removal of a voltage. One way to measure switching speed is to monitor the optical response of the film while applying and then removing the voltage. Switching speeds were obtained by giving a sample a 1 sec, 33.3 Hz square wave signal at $E_{90}$. The time it takes a device to go from 10% to 90% of its final response, when the voltage is applied may be referred to as the "rise time", while the time for the device to drop from 90% to 10% of its response, upon removal of the voltage, may be referred to as the "fall time". The measured switching speeds depend on the voltage applied. For displays that show moving graphics, it is desirable to have rise and fall times of less than about 50 msec. If the switching speeds are much slower, blurring of the moving image results. For "frame-sequential" displays, faster rise and fall times, e.g., less than about 15 msec, are desired to obtain good color purity.

The voltage holding ratio (VHR) is defined as the percentage of the originally applied voltage that remains at the end of a 15 msec hold time. VHR was measured by applying a series of alternating polarity voltage pulses to the devices. The pulses were 30–300 μm sec in duration and were applied every 15 msec. During the 15 msec hold time, the device was held in open circuit and the decay of the applied voltage across the device was monitored. The VHR measurement was taken at "steady state", which for most devices tested was obtained after 20 pulses. Larger values of VHR are more desirable. The VHR measurement was normally performed at or above $E_{90}$. Displays of the present invention preferably have a VHR that is at least 50%, more preferably at least 80%, and most preferably at least 90%.

A device may show hysteresis in its optical response—the optical response of a device at a given voltage depends on whether the device reached the given voltage from a previously higher or lower voltage. Many displays are designed such that a given electrical signal (voltage) should correspond to a desired optical response. Hysteresis degrades the ability of the device to accurately reach that desired optical response. This would have the effect of lowering the number of gray levels in a high resolution display. One way to measure hysteresis is to ramp the voltage applied to the device up and then down to compare optical response curves. The greater the difference between the up and down curves, the greater the hysteresis. The hysteresis value for a device would depend strongly on the time and voltages used in the test. In most applications, it is desired to have the hysteresis as low as possible: less than 20% difference, with less than 6% preferred.

EXAMPLE I

Into a vial was weighed 8.4922 g of liquid crystal TL216 (EM Industries) and 1.5519 g of acrylate mixture PN393 (EM Industries). This mixture was stirred until clear, then 9.8508 g of it was added into a beaker. To this beaker was added 10.9622 g of a 10% w/w aqueous solution PVA (Airvol™ 205) and 6.5545 g of water. This solution was mixed to yield an emulsion with a mean volume diameter of 1.80 μm as determined by Coulter counter. The emulsion was degassed overnight, and then cooled at about 0° C. for 30 mid prior to curing with an ultraviolet (UV) light source at 12 mW/cm² for 5 min. The cured emulsion was then poured into a tube and centrifuged in a multi-step process. The supernatant was decanted leaving a pellet of centrifuged emulsion at the base of the tube. The pellet was determined to have 17.56% water by drying a portion of the pellet overnight at 60° C. Into a vial was added 0.800 g of pellet and 1.0387 g of a 50/50% solution of PVA (Airvol™ 205) and Neorez™ 967 polyurethane (from ICI Resins). The mixture was stirred gently with a spatula and filtered through a 3 μm membrane.

The emulsion was then coated onto an ITO-glass substrate and was allowed to dry. The coating was then placed into direct contact with a solution of TL216 liquid crystal (EM Industries) containing 3% MGG1 dye (consisting of 27% SI486, 27% M618 (both from Mitsui Toatsu Chemicals), and 46% GX874 (from Nippon Kankoh Shikiso Kenkyusho)). The liquid crystal material and dye were supported by 1 mil spacers. The contact was maintained for about 4 hr at a temperature of about 50° C. The coating and dyed liquid crystal material were then separated, and the excess dye and liquid crystal material were removed by a nitrogen stream. A second ITO glass substrate was laminated onto the now-dyed coating.

The resulting device was characterized for electro-optical performance as a function of temperature (Table 1). It showed remarkably flat electro-optical behavior from 5° to 55° C., with a room temperature $E_{90}$ of 0.80 V/μm.

TABLE 1

| Temperature (°C.) | $T_{off}$ (%) | $T_{on}$ (%) | $V_{90}$ (V) | $E_{90}$ (V/μm) | Rise Time (msec) | Fall Time (msec) | VHR (%) |
| --- | --- | --- | --- | --- | --- | --- | --- |
| 5 | 14.06 | 68.9 | 6.1 | 0.71 | 272 | 299 | 94.3 |
| 15 | 14.02 | 66.9 | 6.6 | 0.77 | 103 | 147 | 95.9 |
| 25 | 14.12 | 65.8 | 6.9 | 0.80 | 60 | 93 | 96.3 |
| 35 | 14.15 | 65.1 | 7.0 | 0.81 | 44 | 71 | 96.4 |
| 45 | 14.54 | 61.9 | 7.3 | 0.85 | 25 | 45 | 95.8 |
| 55 | 15.08 | 60.4 | 7.4 | 0.86 | 17 | 35 | 94.3 |

(Sample thickness was 8.6 μm in each instance.)

EXAMPLE II

Into a vial was weighed 12.00 g of liquid crystal TL205 (EM Industries), 2.3529 g of acrylate mixture PN393, and 0.0471 g of 1,1,1-trimethylolpropane trimethacrylate ("TMPTMA," from Polysciences). To this beaker was added 16.00 g of a 10% w/w aqueous solution PVA (Airvol™ 205) and 9.60 g of water. This solution was mixed to yield an emulsion with a mean volume diameter of 2.0 μm (Coulter counter). The emulsion was degassed overnight, and then cooled at about 0° C. for 30 rain prior to curing with an UV light source at 12 mW/cm² for 5 min. The cured emulsion was then poured into a tube and centrifuged (13,500 rpm for 70 min). The supernatant was decanted leaving a pellet of emulsion at the base of the tube. The pellet was determined to have 20% water by drying a portion thereof overnight. Into a vial as added 0.7776 g of pellet and 0.9262 g of a 6.34% w/w aqueous solution of Joncryl™ 77 copolymer. The mixture was stirred gently with a spatula and filtered through a 5 μm membrane. Into another vial was added 0.8624 g of pellet and 1.0264 g of a 6.32% w/w solution of Joncryl™ 74 copolymer. The mixture was stirred gently with a spatula and filtered through a 5 μm membrane.

Both emulsions were then coated onto ITO glass substrates and were allowed to dry. The coatings were then placed into direct contact with a solution of TL205 liquid crystal containing 3% MGG1 dye. The liquid crystal material and dye were supported by 1 mil spacers. The contact was maintained for about 4 hours at a temperature of about 50° C. The coating and dyed liquid crystal material were then separated, and the excess dye and liquid crystal material were removed by a nitrogen stream. A second ITO glass substrate was laminated onto the now-dyed coatings.

Electro-optical data for these devices appear in Table 2. Also included is a comparative device worked up in accordance with this example in a 50:50 blend of PVA (Airvol™ 205) and Neorez™ 967 polyurethane (from ICI Resins).

TABLE 2

| Sample | Thickness (μm) | $T_{off}$ (%) | $T_{on}$ (%) | $V_{90}$ (V) | $E_{90}$ (V/μm) | Rise Time (msec) | Fall Time (msec) | VHR (%) |
| --- | --- | --- | --- | --- | --- | --- | --- | --- |
| 50:50 Blend | 7.6 | 18.50 | 66.3 | 3.5 | 0.46 | 173.3 | 776.5 | 94.6 |
| Joncryl 74 | 7.9 | 16.05 | 65.4 | 5.2 | 0.66 | 91 | 457 | 90.5 |
| Joncryl 77 | 6.4 | 23.44 | 69.9 | 3.9 | 0.61 | 107 | 492 | 84.0 |

EXAMPLE III

Into a vial was weighed 2.1499 g of liquid crystal TL205, 0.4210 g of acrylate mixture PN393, and 0.0084 g of TMPTMA. This mixture was stirred until clear, then 2.4 g of it was added into a beaker. To this beaker was added 3.23 g of a 40% w/w solution of Neorez™ 967 polyurethane in 3.6 g of water. This solution was mixed to yield an emulsion with a mean volume diameter of 3.0 μm (Coulter couriter). The emulsion was degassed overnight, and then cooled at about 0° C. for 30 min prior to curing with an UV light source at 12 mW/cm² for 5 min. The mixture was filtered through a 5 μm membrane.

The emulsion was then coated onto an ITO glass substrate, and it was allowed to dry for more than 1 hr. The coating was then placed into direct contact with a solution of TL205 liquid crystal containing 3% MGG1 dye. The liquid crystal material and dye were supported by 1 mil spacers. The contact was maintained for about 3 hr at a temperature of about 50° C. The coating and dyed liquid crystal material were then separated, and the excess dye and liquid crystal material were removed by a nitrogen stream. A second ITO glass substrate was laminated onto the now-dyed coating. Table 3 summarizes the electro-optical performance.

TABLE 3

| Thickness (μm) | $T_{off}$ (%) | $T_{on}$ (%) | $V_{90}$ (V) | $E_{90}$ (V/μm) | Rise Time (msec) | Fall Time (msec) | VHR (%) |
| --- | --- | --- | --- | --- | --- | --- | --- |
| 6.0 | 44.31 | 76.6 | 13.1 | 2.18 | 12 | 62 | 94.0 |

EXAMPLE IV

Into a vial was weighed 0.4066 g liquid crystal TL205 and 0.1017 g of acrylate mixture PN393. Epostar 10 μm glass spacers were added to the homogeneous solution. Several drops were placed on a 43 mil ITO-coated glass substrate. A piece of 7 mil ITO-coated Mylar poly(ethylene terephthalate) ("PET") was used as the top piece. In order to maintain flatness, the Mylar PET was temporarily affixed to a glass substrate using water. The top piece was lowered onto the liquid crystal/acrylate solution so that the Mylar PET was in contact with the solution. The device was cured at 10 mW/cm² for 5 min at about 15° C. The sample was allowed to equilibrate at 15° C. for 5 min prior to UV exposure. The Mylar PET was removed. The sample was placed face down on 1 mil spacers on a 50° C. hot plate. A solution of TL205 liquid crystal containing 3% MGG1 dye was capillary filled onto the sample. The device was allowed to soak for about 3 hr at 50° C. Excess dye/liquid crystal was blown off with nitrogen. The sample was laminated with an etched substrate for electro-optical characterization (Table 4). This example illustrates imbibition into a film made by the phase separation (PIPS) method.

TABLE 4

| Sample | Thickness (μm) | $T_{off}$ (%) | $T_{on}$ (%) | $V_{90}$ (V) | $E_{90}$ (V/μm) | Rise Time (msec) | Fall Time (msec) | VHR (%) |
| --- | --- | --- | --- | --- | --- | --- | --- | --- |
| TL205/PN393 | 11.3 | 8.97 | 55.5 | 12.0 | 1.06 | 38.2 | 142.3 | 91.19 |

EXAMPLE V

Several imbibed samples were laminated to complementary metal-oxide semiconductor chips (CMOS), on which various video signals were applied. The materials used followed the same general recipe; a typical example is listed below.

Into a vial was weighed 50.8 g of liquid crystal TL205, 10.113 g of acrylate mixture PN393, and 0.2023 g of TMPTMA. This mixture was stirred until clear, then 59.5 g of it was added into a beaker. To this beaker was added 66.11 g of a 10% w/w aqueous solution PVA (Airvol™ 205) and 39.665 g of water. This mixture was mixed to yield an emulsion with a mean volume diameter of 1.82 μm as determined by Coulter counter. The emulsion was degassed overnight, and then cooled at about 0° C. for 30 min prior to curing with an UV light source at 11 mW/cm² for 5 min. The cured emulsion was then poured into a tube and centrifuged in a multi-step process. The supernatant was decanted leaving a pellet of centrifuged emulsion at the base of the tube. The pellet was determined to have 18.45% water by drying a portion thereof overnight. Into a vial was added 9.5 g of pellet and 14.7606 g of a 50/50% solution of PVA (Airvol™ 205) and Neorez™ 967 polyurethane [from ICI Resins]). To this vial was also added 8.0 g of a 1.0% solution of an oligomeric coating aid of the structure

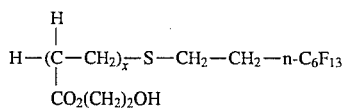

where the degree of oligomerization x is about 7.2. This and other coating aids are described in copending, commonly-assigned application of Lau, entitled "Amphiphilic Telomers", Ser. No. 08/222,149 (Attorney Docket No. MP1499-US1), filed Mar. 31, 1994, and which disclosure is hereby incorporated by reference. The mixture was stirred gently with a spatula and filtered through a 5 μm membrane.

The emulsion was then coated onto an ITO glass substrate and allowed to dry. The coating was then placed into direct contact with a solution of TL205 liquid crystal containing 3% MGG1 dye. The liquid crystal material and dye were supported by 1 mil spacers. The contact was maintained for about 4 hours at a temperature of about 50° C. The coating and dyed liquid crystal material were then separated, and the excess dye and liquid crystal material were removed by a nitrogen stream. A reflective CMOS wafer was laminated onto the now-dyed coating. The resulting device was then driven with various checkerboard patterns applied to the CMOS chip, showing good contrast at reasonably low voltages.

Usually, the liquid crystal material in which the dye is dissolved is the same as liquid crystal material in the undyed film. However, this is not a necessary feature of the present invention. For instance, following the procedure of Example VI, a black dye in a liquid crystal material was imbibed into a film including droplets of the TL205 liquid crystal material.

EXAMPLE VI

An open-faced film was made as described in Example II with 50:50 PVA (Airvol™ 205) and NeoRez R967 as the matrix material. The film was stored in a box at room temperature for more than 2 weeks. The film was inverted and placed in contact with E37 (Merck Ltd.) liquid crystal containing 3% of MGG1 dichroic dye mixture at 60° C. for 18 hr. The excess liquid crystal was blown off with nitrogen and a second ITO-coated glass substrate was laminated onto the film. The electro-optical performance of the film was determined. The $T_{off}$ was 22%, indicating significant dye absorption. The $V_{90}$ was 4.7 Volts. When the voltage was removed from the sample, the sample remained partly on (52% transmission). The sample returned to the original $T_{off}$ of 22% if heated to about 50° C. This behavior was repeatable. The VHR for the film was 79% at $V_{90}$ (4.7V) and 96% at 30V.

Yet another approach is to cause the dye to diffuse from one set of liquid crystal droplets to another. This approach is described in Example VII.

EXAMPLE VII

This example involves a standard acrylate-containing undyed emulsion blended with a large particle dyed aqueous emulsion.

Into a vial was weighed 9.231 g of liquid crystal TL205, 1.81 g of acrylate mixture PN393, and 0.0362 g of TMPTMA. This mixture was stirred until clear, then 10.2763 g of it was added into a beaker. To this beaker was added 11.686 g of a 9.77% w/w aqueous solution PVA (Airvol™ 205) and 6.58 g of water. This solution was mixed to yield an emulsion with a mean volume diameter of 1.85 μm as determined by Coulter counter. The emulsion was degassed overnight, and then cooled at about 0° C. for 30 min prior to curing with an UV light source at 4 mW/cm² for 30 min. The cured emulsion was then poured into a tube and centrifuged. The supernatant was decanted leaving a pellet of emulsion at the base of the tube. The pellet was determined to have 21.7% water by drying a portion thereof overnight. Into a vial was added 1.3207 g of pellet and 1.5218 g of a 6.3% w/w solution of Neorez™ 967 polyurethane. The mixture was stirred gently with a spatula and allowed to sit.

For the dyed emulsion, 2.0149 g of a 7% solution of MGG1 dye in TL205 liquid crystal was weighed into a beaker. To this beaker was added 4.0549 g of a 10% w/w aqueous solution PVA (Airvol™ 205. This solution was mixed to yield an emulsion with a mean volume diameter of 2.8 μm as determined by Coulter counter.

Into a new beaker, 2.6335 g of the acrylate:containing undyed emulsion was combined with 0.6964 g of the dyed emulsion; the mixture was stirred gently with a spatula and filtered through an 8 μm membrane. The emulsion was then coated onto an ITO-coated Mylar PET substrate and allowed to dry for 1 hour. Another piece of ITO-coated Mylar PET was then laminated to the top of the coating. Electro-optical data was collected after device formation, as well as after aging, for about 691 hr at 60° C. When compared to a device consisting of just the dyed emulsion (the control sample in Table 5), it was found that the operating voltage is substantially reduced by blending with the acrylate-containing emulsion.

TABLE 5

| Sample | Thickness (μm) | $T_{off}$ (%) | $T_{on}$ (%) | $V_{90}$ (V) | $E_{90}$ (V/μm) | Rise Time (msec) | Fall Time (msec) | VHR (%) |
| --- | --- | --- | --- | --- | --- | --- | --- | --- |
| Control | 8.8 | 1.82 | 30.4 | 126.0 | 14.3 | 4.3 | 126 | 80.6 |
| Initial Blend | 12.0 | 13.49 | 58.6 | 55.8 | 4.65 | 1.7 | 491 | 96.4 |
| After 691 hr at 60° C. Blend | 12.0 | 11.57 | 60.2 | 39.3 | 3.28 | 3 | 301 | 94.7 |

Liquid crystal displays used for displaying high information content and motion such as videos often contain "active matrix panels" as electronic drivers for providing the voltage signal to the liquid crystal composite. For displays operated via active matrix drive, it is desirable to have liquid crystal composites that have good contrast as well as high brightness at low drive voltages, and which also are highly resistive in order to maintain the voltage supplied by the active matrix panel. The present invention provides a means of obtaining good contrast, high brightness, low voltage, high resistivity liquid crystal composites for use with active matrix drive panels.

One of the substrates 15a or 15b can be a substrate which provides s different electrical signals to different portions (picture elements or pels) of the display. This substrate, which is sometimes referred to as the driver, provides the ability to display patterns by having portions of the liquid crystal composite of the display at various levels of transmission. The driver can be a patterned electrode, or it can be an "active matrix panel". An active matrix panel has an active electronic element, e.g., a transistor, at each picture element. The active matrix panel can be either transmissive, e.g., a thin film transistor array (TFT) on glass, or non-transmissive, e.g., a CMOS wafer.

The present invention provides for, among other things, the introduction of a dye into droplets of liquid crystal material after an interfacial material is cured. Thus, the dye does not interfere with the curing or polymerization of the interfacial material. A liquid crystal material including the dye is used as a carrier for introduction of the dye into the droplets or capsules of the liquid crystal material. The resultant composite provides a device with good contrast ratios and low operating voltages.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A method of making a liquid crystal composite comprising plural volumes of a liquid crystal material and a component dispersed in a containment medium, comprising the steps of:
   (a) forming volumes of the liquid crystal material in said containment medium; and
   (b) imbibing the component into the liquid crystal material in the volumes by placing a solution of the component and a liquid crystal material into contact with said containment medium.

2. A method according to claim 1, wherein the component is selected from the group consisting of additives, interface modifiers and twist agents.

3. A method according to claim 1, wherein the component is a pleochroic dye.

4. A method according to claim 3, wherein the liquid crystal material in the volumes is a nematic liquid crystal material having positive dielectric anisotropy.

5. A method according to claim 3, wherein the pleochroic dye is selected from the group consisting of azo, anthraquinone and perylene dyes.

6. A method according to claim 3, wherein the containment medium is selected from the group consisting of acrylates, methacrylates, epoxies, polyurethanes, poly(vinyl alcohol), polyureas, siloxanes, vinyl polymers, and mixtures thereof.

7. A method according to claim 3, wherein the liquid crystal material in the volumes is the same as the liquid crystal material in the solution including the dye.

8. A method according to claim 3, wherein the index of refraction of the containment medium is substantially the same as the ordinary index of refraction of the liquid crystal material in the volumes.

9. A method according to claim 3, wherein the volumes are formed by an emulsification process.

10. A method according to claim 3, wherein the volumes are formed by a phase-separation process.

11. A method according to claim 3, wherein the imbibing is accomplished by mixing a dye-containing emulsion with the volumes.

12. A method of making a liquid crystal composite comprising plural volumes of liquid crystal material and a dye dispersed in a matrix material, wherein the liquid crystal material is at least partially separated from the matrix material by at least one further material, comprising the steps of:
   (a) forming capsules in which the liquid crystal material is surrounded by the at least one further material;
   (b) dispersing the capsules in a medium in which the matrix material or a precursor thereof is present;
   (c) causing the matrix material or precursor thereof to set around the capsules; and
   (d) imbibing the pleochroic dye into the liquid crystal material in the capsules.

13. A method according to claim 12, wherein the liquid crystal material is a nematic liquid crystal material having positive dielectric anisotropy.

14. A method according to claim 12, wherein the matrix material is selected from the group consisting of polyurethane, poly(vinyl pyrrolidone), poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

15. A method of making a liquid crystal composite including a pleochroic dye, wherein a liquid crystal material is at least partially separated from a matrix material by an encapsulating material and an interfacial material disposed around the liquid crystal material, comprising:
   (a) forming capsules in which the liquid crystal material is surrounded by the interfacial material and the encapsulating material;
   (b) dispersing the capsules in a medium in which the matrix material or a precursor thereof is present;
   (c) causing the matrix material or precursor thereof to set around the capsules, to form plural volumes of the liquid crystal material dispersed in the matrix material; and
   (d) placing a solution of the pleochroic dye and a liquid crystal material into contact with the matrix material to imbibe the pleochroic dye into the liquid crystal material in the plural volumes dispersed in the matrix material.

16. A method according to claim 15, wherein the liquid crystal material in the plural volumes is a nematic liquid crystal material having a positive dielectric anisotropy.

17. A method according to claim 16, wherein the pleochroic dye is selected from the group consisting of azo, anthraquinone and perylene dyes.

18. A method according to claim 16, wherein the encapsulating material is selected from the group consisting of poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

19. A method according to claim 18, wherein the matrix material is selected from the group consisting of polyurethanes, poly(vinyl alcohol), poly(vinyl pyrrolidone), poly(ethylene glycol), poly(acrylic acid) and its copolymers, poly(hydroxy acrylate), cellulose derivatives, epoxies, silicones, acrylates, polyesters, styrene-acrylic acid-acrylate terpolymers, and mixtures thereof.

20. A method according to claim 15, wherein the interfacial material is selected from the group consisting of acrylates, methacrylates, epoxies, polyurethanes, polyureas, siloxanes, vinyl polymers, and mixtures thereof.

21. A method according to claim 15, wherein the interfacial material, encapsulating material, and matrix material comprise poly(2-ethylhexyl acrylate), poly(vinyl alcohol), and a blend of poly(vinyl alcohol) and polyurethane, respectively.

22. A method according to claim 21, wherein the dye is a black pleochroic dye mixture.

23. A method according to claim 15, wherein the encapsulating material is fixed in place by crosslinking or physical entanglement of molecular chains.

24. A method according to claim 15, wherein the solution of the liquid crystal material and pleochroic dye is placed in contact with the matrix material at a temperature of between about 20° and 90° C.

25. A method according to claim 24, wherein the solution of liquid crystal material and pleochroic dye contains between about 0.5% and 5% by weight dye.

26. A method according to claim 15, wherein any excess liquid crystal material and pleochroic dye are removed from a surface of the matrix material by directing a nitrogen stream thereacross.

27. A method according to claim 15, wherein the liquid crystal material in the plural volumes dispersed in the matrix material is the same as the liquid crystal material in solution with the pleochroic dye placed into contact with the matrix material.

28. A .method for making a liquid crystal composite wherein plural volumes of a liquid crystal material and a dye are dispersed in an encapsulating material and the liquid crystal material and dye are at least partially separated from the encapsulating material by an interfacial material disposed therebetween, which method comprises the steps of:

(a) forming an emulsion comprising the encapsulating material, the interfacial material or a precursor thereof, the liquid crystal material, and an aqueous carrier medium, under conditions such that (i) plural volumes of the liquid crystal .material are contained by the encapsulating material and (ii) the interfacial material or a precursor thereof forms a homogeneous solution with the liquid crystal material and optionally a solvent in which the interfacial material or precursor thereof and the liquid crystal material are mutually soluble;

(b) polymerizing the precursor of the interfacial material to form the interfacial material, where such precursor is present;

(c) removing the aqueous carrier medium;

(d) dispersing the plural volumes in a medium in which a matrix material or precursor thereof is present;

(e) causing the matrix material or a precursor thereof to set around the plural volumes to form a liquid crystal film; and (f) imbibing a pleochroic dye into the liquid crystal material in the plural volumes by placing a solution of pleochroic dye and a liquid crystal material into contact with the liquid crystal film.

\* \* \* \* \*